US009621987B2

(12) United States Patent
Watson et al.

(10) Patent No.: US 9,621,987 B2
(45) Date of Patent: *Apr. 11, 2017

(54) UN-TETHERED WIRELESS AUDIO SYSTEM

(71) Applicant: Apple Inc., Cupertino, CA (US)

(72) Inventors: Clarke S. Watson, San Carlos, CA (US); Benjamin W. Cook, San Francisco, CA (US); Axel D. Berny, San Francisco, CA (US); Jason A. Trachewsky, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,985

(22) Filed: Apr. 27, 2015

(65) Prior Publication Data

US 2015/0304770 A1    Oct. 22, 2015

Related U.S. Application Data

(63) Continuation of application No. 14/290,198, filed on May 29, 2014, now Pat. No. 9,020,437, which is a
(Continued)

(51) Int. Cl.
*H04B 7/00* (2006.01)
*H04R 5/02* (2006.01)
(Continued)

(52) U.S. Cl.
CPC ............ *H04R 3/00* (2013.01); *H04L 1/16* (2013.01); *H04R 5/02* (2013.01); *H04R 5/04* (2013.01);
(Continued)

(58) Field of Classification Search
CPC ... H04R 3/00; H04R 5/02; H04R 5/04; H04R 2420/07; H04W 4/008; H04W 4/001;
(Continued)

(56) References Cited

U.S. PATENT DOCUMENTS 7,509,181 B2    3/2009  Champion
7,610,013 B2   10/2009  Suturdja
(Continued)

FOREIGN PATENT DOCUMENTS

EP    1887832    2/2008

OTHER PUBLICATIONS

Non-Final Office Action (dated Aug. 28, 2013), U.S. Appl. No. 13/220,224, filed Aug. 29, 2011, First Named Inventor: Benjamin W. Cook, (22 pages).
(Continued)

*Primary Examiner* — Dominic Rego
(74) *Attorney, Agent, or Firm* — Blakely, Sokoloff, Taylor & Zafman LLP

(57) ABSTRACT

A wireless speaker audio system configured to receive audio information wirelessly transmitted by an audio source including first and second wireless transceivers. The first wireless transceiver establishes a bidirectional secondary wireless link with the audio source for receiving and acknowledging receipt of the audio information. The first and second wireless transceivers communicate with each other via a primary wireless link. A wireless audio system including an audio source and first and second wireless transceivers. The first and second wireless transceivers communicate via a primary wireless link. The audio source communicates audio information to the first wireless transceiver via a secondary wireless link which is configured according to a standard wireless protocol. The first wireless transceiver is configured to acknowledge successful reception of audio information via the secondary wireless link.

20 Claims, 6 Drawing Sheets

Related U.S. Application Data continuation of application No. 13/220,224, filed on Aug. 29, 2011, now Pat. No. 8,768,252.

(60) Provisional application No. 61/379,583, filed on Sep. 2, 2010.

(51) Int. Cl.

| | | |
|---|---|---|
| *H04R 3/00* | (2006.01) | |
| *H04R 5/04* | (2006.01) | |
| *H04W 4/00* | (2009.01) | |
| *H04L 1/16* | (2006.01) | |
| *H04L 1/00* | (2006.01) | |

(52) U.S. Cl.
CPC .......... *H04W 4/001* (2013.01); *H04W 4/008* (2013.01); *H04L 2001/0092* (2013.01); *H04L 2001/0097* (2013.01); *H04R 2420/07* (2013.01)

(58) Field of Classification Search
CPC ............... H04L 1/16; H04L 2001/0092; H04L 2001/0097
USPC ... 455/3.01, 3.05, 3.06, 414.1, 41.2; 381/58, 381/59, 96, 111, 300, 17, 316
See application file for complete search history.

(56) References Cited

U.S. PATENT DOCUMENTS

| | | | |
|---|---|---|---|
| 7,848,289 | B2 | 12/2010 | Jose |
| 7,903,828 | B2 | 3/2011 | Rodman |
| 7,944,922 | B2 | 5/2011 | Kinder et al. |
| 8,244,307 | B1 | 8/2012 | Tilgner et al. |
| 2002/0159611 | A1 | 10/2002 | Cromer et al. |
| 2004/0037433 | A1 | 2/2004 | Chen |
| 2006/0009985 | A1 | 1/2006 | Ko et al. |
| 2006/0177073 | A1 | 8/2006 | Isaac et al. |
| 2006/0198547 | A1 | 9/2006 | Hampton et al. |
| 2008/0089268 | A1 | 4/2008 | Kinder et al. |
| 2009/0079883 | A1 | 3/2009 | Banks et al. |
| 2009/0081948 | A1 | 3/2009 | Banks et al. |
| 2009/0154739 | A1 | 6/2009 | Zellner |
| 2009/0238375 | A1 | 9/2009 | Pilati et al. |
| 2009/0298420 | A1 | 12/2009 | Haartsen et al. |
| 2010/0135500 | A1 | 6/2010 | Derleth et al. |
| 2010/0188212 | A1 | 7/2010 | Jochelson |
| 2010/0217412 | A1 | 8/2010 | Abraham |
| 2010/0232618 | A1 | 9/2010 | Haartsen et al. |
| 2010/0284389 | A1 | 11/2010 | Ramsay et al. |
| 2010/0285750 | A1 | 11/2010 | Simonelic |
| 2010/0299639 | A1 | 11/2010 | Ramsay et al. |
| 2011/0116642 | A1 | 5/2011 | Hall et al. |
| 2011/0123038 | A1 | 5/2011 | Clark |
| 2011/0129048 | A1 | 6/2011 | Barbe et al. |
| 2012/0087503 | A1 | 4/2012 | Watson et al. |
| 2012/0114158 | A1 | 5/2012 | Gysin |
| 2012/0183158 | A1 | 7/2012 | Tracy |
| 2012/0230510 | A1 | 9/2012 | Dinescu et al. |
| 2012/0231758 | A1 | 9/2012 | Sharma et al. |
| 2012/0275618 | A1 | 11/2012 | Tan et al. |
| 2014/0032630 | A1 | 1/2014 | Igoe |

OTHER PUBLICATIONS

PCT International Search Report and Written Opinion (dated Oct. 2, 2012), International Application No. PCT/US2012/045720, International Filing Date—Jul. 6, 2012, (8 pages).

PCT International Preliminary Report on Patentability (dated Mar. 13, 2014), International Application No. PCT/US2012/045720, International Filing Date—Jul. 6, 2012, (6 pages).

Non-Final Office Action (dated Sep. 10, 2014), U.S. Appl. No. 14/290,198, filed May 29, 2014, First Named Inventor: Clarke S. Watson, (6 pages).

UN-TETHERED WIRELESS AUDIO SYSTEM

CROSS-REFERENCE TO RELATED APPLICATIONS

This application is a continuation of application Ser. No. 14/290,198, filed May 29, 2014, entitled "Un-Tethered Wireless Audio System", which will issue as U.S. Pat. No. 9,020,437 on Apr. 28, 2015, which is a continuation of U.S. patent application Ser. No. 13/220,224, filed Aug. 29, 2011, which issued as U.S. Pat. No. 8,768,252 on Jul. 1, 2014, which application claims the benefit of U.S. Provisional Application Ser. No. 61/379,583, filed on Sep. 2, 2010 which is herein incorporated by reference in its entirety for all intents and purposes.

BACKGROUND OF THE INVENTION

Field of the Invention

The present invention relates generally to un-tethered wireless transceivers that communicate with an audio source, and more particularly to an audio system which eliminates the need for a wired connection between the first and second wireless transceivers.

Description of the Related Art

The most common type of wireless stereo audio loudspeakers consists of a single radio frequency (RF) transceiver delivering audio to separate left and right loudspeakers via a wired connection. The term "loudspeaker" as used herein refers to any electro-acoustic transducer and includes, but is not limited to, home and professional audio speakers and headphones, earphones, ear buds, etc. The audio system may use a standard wireless protocol, such as Bluetooth or Wi-Fi® (based on the IEEE 802.11 family of standards of the Institute of Electrical and Electronics Engineers) or the like. The term "standard wireless protocol" or "standard protocol" as used herein refers to any open or publicly available wireless protocol or any wireless protocol that is a product of a standards body or special interest group, which includes but is not limited to Bluetooth and Wi-Fi®. The term "proprietary wireless protocol" or "proprietary protocol" as used herein refers to any wireless protocol other than a standard wireless protocol. Less common configurations are wireless loudspeakers that consist of separate RF receivers for the left and right audio channel. These loudspeakers use proprietary wireless protocols only.

A significant disadvantage of wireless stereo loudspeakers that use a proprietary wireless protocol is that a separate RF transmitter must be added to the audio source since the audio source does not otherwise support the proprietary protocol. These RF transmitters are typically in the form of a dongle, which plugs into the audio source. The dongle adds bulk to portable systems, and shortens battery life if it draws power from the audio source. If the dongle has its own power source, then it becomes one more item that requires a charger.

A significant disadvantage of wireless stereo loudspeakers that use standard protocols, such as Bluetooth or Wi-Fi® or the like, is that these protocols were not designed to reliably carry stereo audio traffic to separate left and right receivers. Therefore, current systems that use standard protocols use a wired connection between the left and right loudspeakers. This results in unsightly or otherwise inconvenient cables for traditional loudspeaker systems, or awkward form factors for small devices such as headphones.

Other corresponding issues related to the prior art will become apparent to one skilled in the art after comparing such prior art with the present invention as described herein.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Various embodiments disclosed herein incorporate a primary RF wireless link between a pair of loudspeakers and a secondary RF wireless link between the audio source and one of the loudspeakers. The primary link may follow a standard wireless protocol, a proprietary wireless protocol, or a combination thereof. The secondary wireless link may follow a standard protocol, thus ensuring compatibility with the largest number of audio sources.

Figure 1:
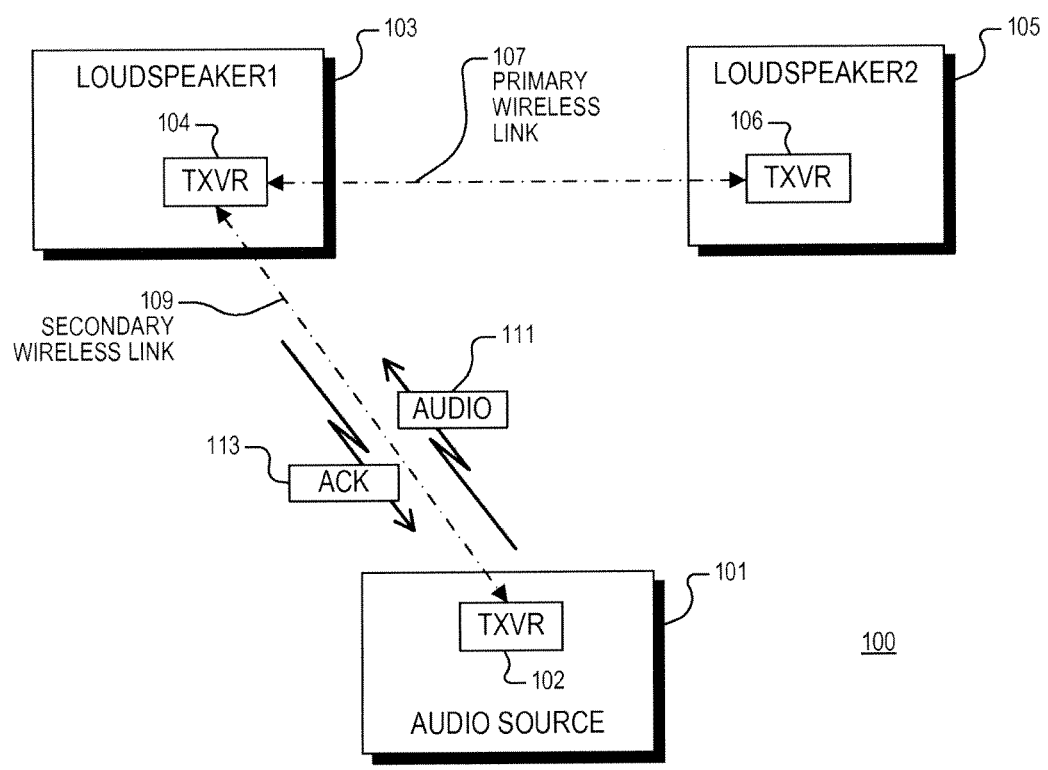
FIG. 1 is a block diagram of a wireless audio system implemented according to an exemplary embodiment of the present invention.

FIG. 1 is a block diagram of a wireless audio system 100 implemented according to an exemplary embodiment of the present invention. The wireless audio system 100 includes an audio source 101, a first loudspeaker 103 (LOUDSPEAKER1) and a second loudspeaker 105 (LOUDSPEAKER2). The specific configuration of the audio source 101 and each of the loudspeakers 103 and 105 depends upon the particular application, which may have any one of several forms. The audio source 101 may be implemented as any one of a mobile phone (e.g., Blackberry, iPhone, etc.), a portable game player, a portable media player (e.g., MP3 player, iPod, etc.), a computer (e.g., PC, Apple computer, etc.), an audio/video (A/V) receiver as part of a home entertainment or home theater system, etc. An A/V receiver, for example, may have both wired and wireless loudspeakers, where the loudspeakers 103 and 105 may be wireless rear channel speakers or the like. The loudspeakers 103 and 105 are configured as any type of electro-acoustic transducers for converting audio information into sound, such as home or professional speakers, headphones, earphones, car buds, etc. The present invention is not limited to any particular physical format or size of the audio source and speaker configuration. The loudspeaker 103 may be a left channel speaker and the loudspeaker 105 may be a right channel speaker, or vice-versa, in which either loudspeaker may be configured for either stereo channel.

The audio source 101 and the loudspeakers 103 and 105 each have a wireless transceiver for sending and receiving wireless communications. As shown, the audio source 101 includes a wireless transceiver (TXVR) 102, the loudspeaker 103 includes a wireless transceiver 104, and the loudspeaker 105 includes a wireless transceiver 106. The transceivers 104 and 106 of the loudspeakers 103 and 105 establish a primary wireless link 107. The transceiver of one of the loudspeakers, such as the transceiver 104, establishes a secondary wireless link 109 with the transceiver 102 of the audio source 101.

In one embodiment, the audio source 101 wirelessly transmits (via TXVR 102) a stream of audio stereo information in the form of one or more packets as understood by those of ordinary skill in the art of wireless communications. Each packet incorporates stereo audio information in the form of compressed or uncompressed stereo samples. The stereo audio information incorporates stereo samples for first and second audio channels, such as Left and Right channels or the like. As shown, for example, the audio source 101 wirelessly transmits a packet 111 incorporating audio information, which is conveyed to the loudspeaker 103 via the secondary wireless link 109. The loudspeaker 103 wirelessly transmits (via TXVR 104) an acknowledgement packet 113 back to the audio source 101 upon successful reception of the packet 111.

The primary wireless link 107 enables wireless communications between the loudspeakers 103 and 105. The communication on the primary wireless link 107 depends upon the particular embodiment, as further described herein. In one embodiment, the loudspeaker 103 relays audio information for conversion by the loudspeaker 105 via the primary wireless link 107. In another embodiment, communication information is provided by the loudspeaker 103 to the loudspeaker 105 to enable the transceiver 106 to "snoop" communications on the secondary wireless link 109.

Figure 2:
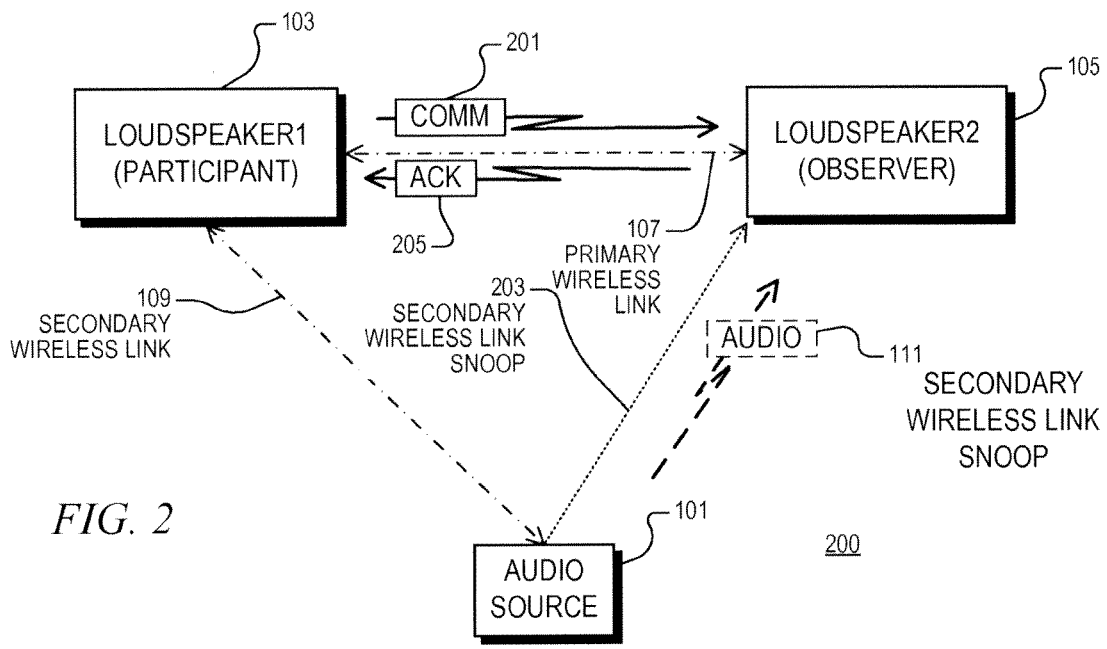
FIG. 2 is a block diagram of a wireless audio system implemented according to one embodiment of the present invention including a participant and an observer of wireless communications.

FIG. 2 is a block diagram of a wireless audio system 200 implemented according to one embodiment of the present invention including a participant and an observer of wireless communications. The wireless audio system 200 includes the audio source 101 and the loudspeakers 103 and 105 in a similar manner as shown for the wireless audio system 100. The transceivers 102, 104 and 106 are included in the respective components, but are not shown for purposes of simplicity of illustration. The secondary wireless link 109 is established between the audio source 101 and the loudspeaker 103 and the primary wireless link 107 is established between the loudspeakers 103 and 105 in substantially the same manner. In this case, the loudspeaker 103 is configured as a participant in the wireless communications across the secondary wireless link 109, whereas the loudspeaker 105 is configured only as an observer in wireless communications across the secondary wireless link 109. As an observer the loudspeaker 105 only receives audio information from the audio source 101 as further described herein, but does not transmit information to the audio source 101.

Once the primary and secondary wireless links 107 and 109 are established, the loudspeaker 103 sends one or more communication parameters 201 to the loudspeaker 105 via the secondary wireless link 109 in order to enable the loudspeaker 105 to receive packets transmitted by the audio source 101. The loudspeaker 105 configures its transceiver 106 to receive communications from the audio source 101 in accordance with the communication parameters 201, and establishes a unidirectional wireless communication path 203 from the audio source 101 to the loudspeaker 105. The communication path 203 enables the loudspeaker 105 to snoop, listen or otherwise eavesdrop communications on the secondary wireless link 109 via the wireless path 203. As understood by those of ordinary skill in the art, the wireless communications from the audio source 101 are typically omni-directional so that the loudspeakers 103 and 105 both receive wireless energy transmissions from the audio source 101. As shown, the transceiver 106 is configured to snoop the secondary wireless link 109 (via path 203) to receive audio information from the audio source 101, such as the packet 111.

In this case, the primary wireless link 107 may be used by the transceiver 106 of the loudspeaker 105 to acknowledge successful reception of communications from the audio source 101. As shown, the loudspeaker 105 transmits acknowledge information 205 to the loudspeaker 103 upon successful reception of a wireless communication from the audio source 101, such as the packet 111.

In this manner, both loudspeakers 103 and 105 receive audio information over the secondary wireless link 109. As previously described, each wireless packet incorporates stereo audio information including first and second audio channels, such as the left audio channel and the right audio channel. One loudspeaker extracts the left audio channel from each packet of the stereo stream for playback, while the other extracts the right channel. When the observer loudspeaker 105 receives a packet from the audio source 101, it provides an acknowledgement to the participant loudspeaker 103 over the primary wireless link 107.

Acknowledgement to the audio source 101 and re-transmissions may be handled in any one of several manners. In a first embodiment, the participant loudspeaker 103 only sends an acknowledgement to the audio source 101 if it receives a packet and the observer loudspeaker 105 has indicated (over the primary wireless link 107) that it received the packet as well, such as by sending the acknowledge information 205. The audio source 101 retransmits unacknowledged packets, such that the observer loudspeaker 105 and/or participant loudspeaker 103 may receive the missing data. In a second embodiment, the participant loudspeaker 103 acknowledges each packet it successfully receives from the audio source 101, and relays to the observer loudspeaker 105 over the primary wireless link 107 any packets that the observer loudspeaker 105 did not acknowledge.

Figure 3:
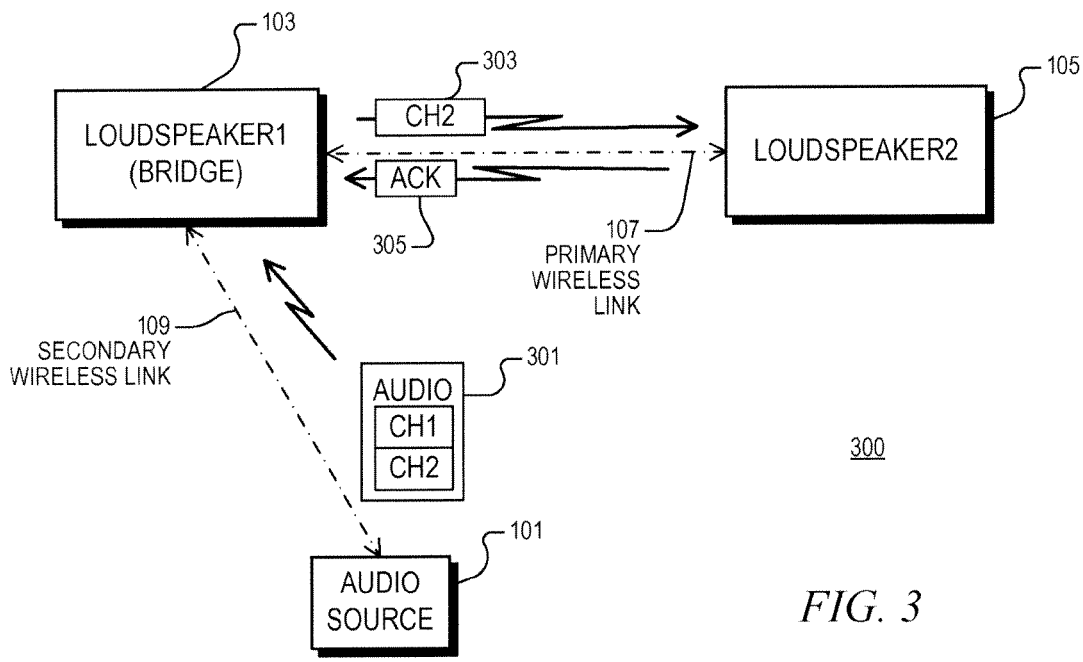
FIG. 3 is a block diagram of a wireless audio system implemented according to one embodiment of the present invention including a bridge configuration for wireless communications.

FIG. 3 is a block diagram of a wireless audio system 300 implemented according to one embodiment of the present invention including a bridge configuration for wireless communications. The wireless audio system 300 includes the audio source 101 and the loudspeakers 103 and 105 in a similar manner as shown for the wireless audio system 100. The transceivers 102, 104 and 106 are included in the respective components, but are not shown for purposes of simplicity of illustration. The secondary wireless link 109 is established between the audio source 101 and the loudspeaker 103 and the primary wireless link 107 is established between the loudspeakers 103 and 105 in substantially the same manner as previously described. In this case, however, the loudspeaker 103 is configured as a bridge or relaying audio information to the loudspeaker 105, and the loudspeaker 105 does not receive audio information directly from the audio source 101.

In this case, only the bridge loudspeaker 103 receives audio traffic over the secondary wireless link 109. As shown, for example, a packet 301 is wirelessly transmitted from the audio source 101 to the bridge loudspeaker 103, and the loudspeaker 105 does not receive the packet 301. The wireless packet 301 includes stereo audio information including a first audio channel CHI and a second audio channel CH2. Either channel may be the left or right audio channel according to stereo audio. The bridge loudspeaker 103 extracts both the first and second audio channels CH 1 and CH2 from the stereo stream, sending the first channel data CH 1 to its local audio buffer for playback and the second channel data CH2 as a separate packet 303 over the primary wireless link 107 to the loudspeaker 105. The bridge loudspeaker 103 buffers the first channel audio data CH 1 until it receives acknowledgement, such as ACK 305, from the loudspeaker 105 via the primary wireless link 107. Unacknowledged packets from the loudspeaker 105 are retransmitted by the loudspeaker 103 to the loudspeaker 105. It is noted that either loudspeaker 103 or 105 may be assigned the role of bridge, in which either one processes the left channel and the other processes the right channel.

The specific configurations of the primary and secondary wireless links 107 and 109 depend upon the implementation or mode of operation. In one embodiment, the primary wireless link 107 may be implemented using a combination of Bluetooth and a proprietary protocol, and the secondary wireless link 109 is implemented using Bluetooth. The combination of Bluetooth and a proprietary protocol is useful in configurations in which the loudspeaker 105 operates in a snoop mode, such as the wireless audio system 200, and timing of the acknowledge from loudspeaker 105 to loudspeaker 103 is particularly significant. In another embodiment, the primary and secondary wireless links 107 and 109 may both be implemented using Bluetooth, such as the wireless audio system 300 in which loudspeaker 103 operates as a bridge. In another embodiment, the primary wireless link 107 is implemented with a non-Bluetooth protocol, and the secondary wireless link 109 is implemented using Bluetooth. The non-Bluetooth protocol may be Wi-Fi® (IEEE 802.11) in a peer-to-peer mode (such as ad-hoc, Wi-Fi Direct®, DLS, etc.) or any other standard or proprietary protocol. In yet another embodiment, a non-Bluetooth protocol is used for both the primary and secondary wireless links 107 and 109. In this case, any standard wireless protocol may be used on the secondary wireless link 109 as long as the audio information is transmitted as a stereo stream, i.e., first and second (or left and right) channels are sent together in the same stream, rather than separate streams for each channel. Other embodiments are envisioned.

Figure 4:
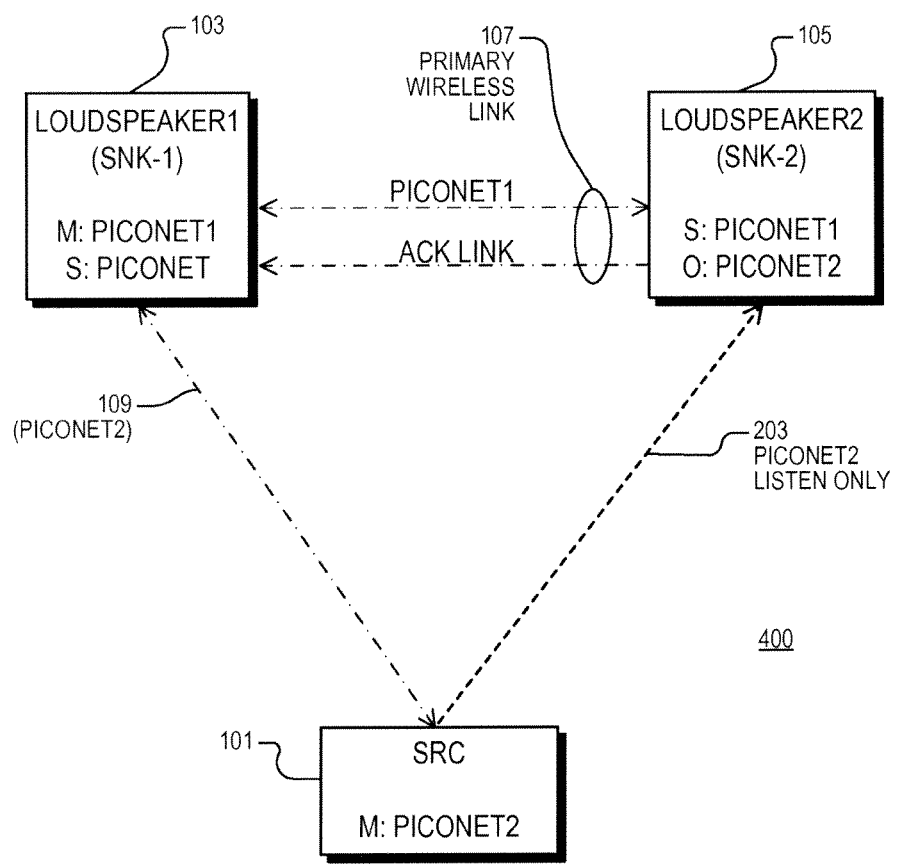
FIG. 4 is a block diagram of a wireless audio system implemented according to a more specific embodiment using Bluetooth stereo audio transported via the Advanced Audio Distribution Profile (A2DP) for wireless communications.

FIG. 4 is a block diagram of a wireless audio system 400 implemented according to a more specific embodiment using Bluetooth stereo audio transported via the Advanced Audio Distribution Profile (A2DP) for wireless communications. The wireless audio system 400 includes the audio source 101 and the loudspeakers 103 and 105. The transceivers 102, 104 and 106 are included in the respective components, but are not shown for purposes of simplicity of illustration. Bluetooth technology is widely deployed in portable media players and mobile phones and the like. It uses various profiles to define the functions that a device provides. Bluetooth stereo audio is transported via the A2DP profile, though the present invention is not limited to this profile, nor are they limited to the Bluetooth protocol, and may be applied to any stereo stream in which the first and second (or left and right) channels are transported together. The A2DP profile refers to the source of the audio data as SRC and the sink of the audio data as SNK. The descriptions that follow use the same terminology, with the addition of suffixes for the SNK to differentiate between the first loudspeaker and channel (SNK-1) and the second loudspeaker and channel (SNK-2).

In the wireless audio system 400, the audio source 101 is configured as the source of the audio data SRC according to the A2DP profile, and the loudspeakers 103 and 105 are configured as sinks of the audio data, shown as SNK-1 and SNK-2, respectively. The primary wireless link 107 is implemented as a combination of a first Bluetooth piconet PICONET1 and a proprietary link referred to as ACK LINK. The loudspeaker 103, configured as SNK-1, is the master (M) of PICONET1, while the loudspeaker 105, configured as SNK-2, is a slave (S) of PICONET1. The ACK LINK is shown as a unidirectional mode from SNK-2 to SNK-1, although a bidirectional configuration is also contemplated as further described below. The secondary wireless link 109 is implemented as a second Bluetooth piconet PICONET2 according to the A2DP profile in which SRC is the master of PICONET2 and the loudspeaker SNK-1 is a slave. Also, the loudspeaker SNK-2 operates as an observer (0) of PICONET2 or listen only mode, shown as the path 203. Since SNK-1 and SNK-2 participate in two piconets simultaneously, they are able to support scatternet operation.

In one embodiment, pairing between SNK-1 and SNK-2 on PICONET1 may be pre-programmed at manufacture, such that they may be permanently paired to one another and have a communication link while powered up. In one embodiment, such pairing means that the two loudspeakers are able to communicate using a common protocol on a common frequency or set of frequencies using predetermined or otherwise known endpoint addresses. The communication between the paired devices may be secure and each device may be authenticated.

After the SNK-1 connects to SRC 101 via the PICONET2 (secondary wireless link 109), it uses PICONET1 to pass information to SNK-2 so that SNK-2 may listen to the communications between SNK-1 and SRC in a "promiscuous" or "listen-only" mode as previously described. As previously described for the wireless audio system 200, SNK-1 sends communication parameters (e.g., communication parameters 201) to SNK-2 to enable SNK-2 to observe communications on PICONET2. For Bluetooth, this information includes, but is not limited to, the Bluetooth Device Address (BD_ADDR) and native clock (CLKN) of SRC, the logical transport address (LT_ADDR) and clock offset of SNK-1, and encryption parameters for the link between SNK-1 and SRC, such as the link key. Note that security is not compromised because these parameters can be sent over PICONET1 while encryption is enabled.

Stereo audio traffic is transported from SRC 101 to SNK-1 and SNK-2 over the PICONET2. An A2DP stream typically carries compressed stereo audio using subband codec (SBC), Moving Picture Experts Group (MPEG) Layer III (MP3), Advanced Audio Coding (AAC), Adaptive Transform Acoustic Coding (ATRAC), or other standard codecs. However, it may also carry proprietary formats, including uncompressed audio. Regardless of the codec, stereo A2DP traffic may be transported in a single stream, i.e., the first and second (or left and right) channels are transported together. SNK-1 extracts the first channel from the stereo audio stream for playback, and SNK-2 extracts the second channel.

The first and second channel audio data is synchronized because both SNK-1 and SNK-2 are listening to the same audio stream at the same time. Therefore, audio buffers in SNK-1 and SNK-2 fill at the same rate. However, SRC 101, SNK-1 and SNK-2 may have different audio frequency references, which may affect the rate at which the audio buffers are emptied. Therefore, SNK-1 and SNK-2 may lock their frequency references to SRC 101 so they play the data back at the same rate. In one embodiment, this may be accomplished through a control loop implemented at each loudspeaker 103 and 105. In addition, PICONET1 may be used to establish a common point in time at which both SNK-1 and SNK-2 begin audio playback.

The ACK LINK provides a channel for SNK-2 to indicate to SNK-1 when it has received a packet. SNK-2 sends one or more short acknowledgement packets with good auto-correlation properties to SNK-1 whenever it receives a packet from SRC 101. SNK-1 only needs to detect one of the acknowledgement packets. Having good auto-correlation properties minimizes false detections, while repeating the packet more than once increases the likelihood of ACK packet detection, and thereby minimizes the number of unnecessary audio packet retransmissions. The acknowledgement packet may be transmitted on the same channel during the idle period that follows the packet transmitted by SRC 101, but before the start of the next slot. Therefore, SNK-1 and SNK-2 do not need to re-tune their radios, but rather SNK-2 merely changes its radio mode from receive to transmit. In an alternative embodiment, the ACK LINK may operate on a different channel other than PICONET2. However, this may require both SNK-1 and SNK-2 to re-tune their radios. For Bluetooth, the minimum idle period between the end of any packet and the start of the next slot is well over 200 microseconds. A radio with fast Rx/Tx turnaround time has ample time to transmit one or more acknowledgements during this idle period without running into the next slot time.

Figure 5:
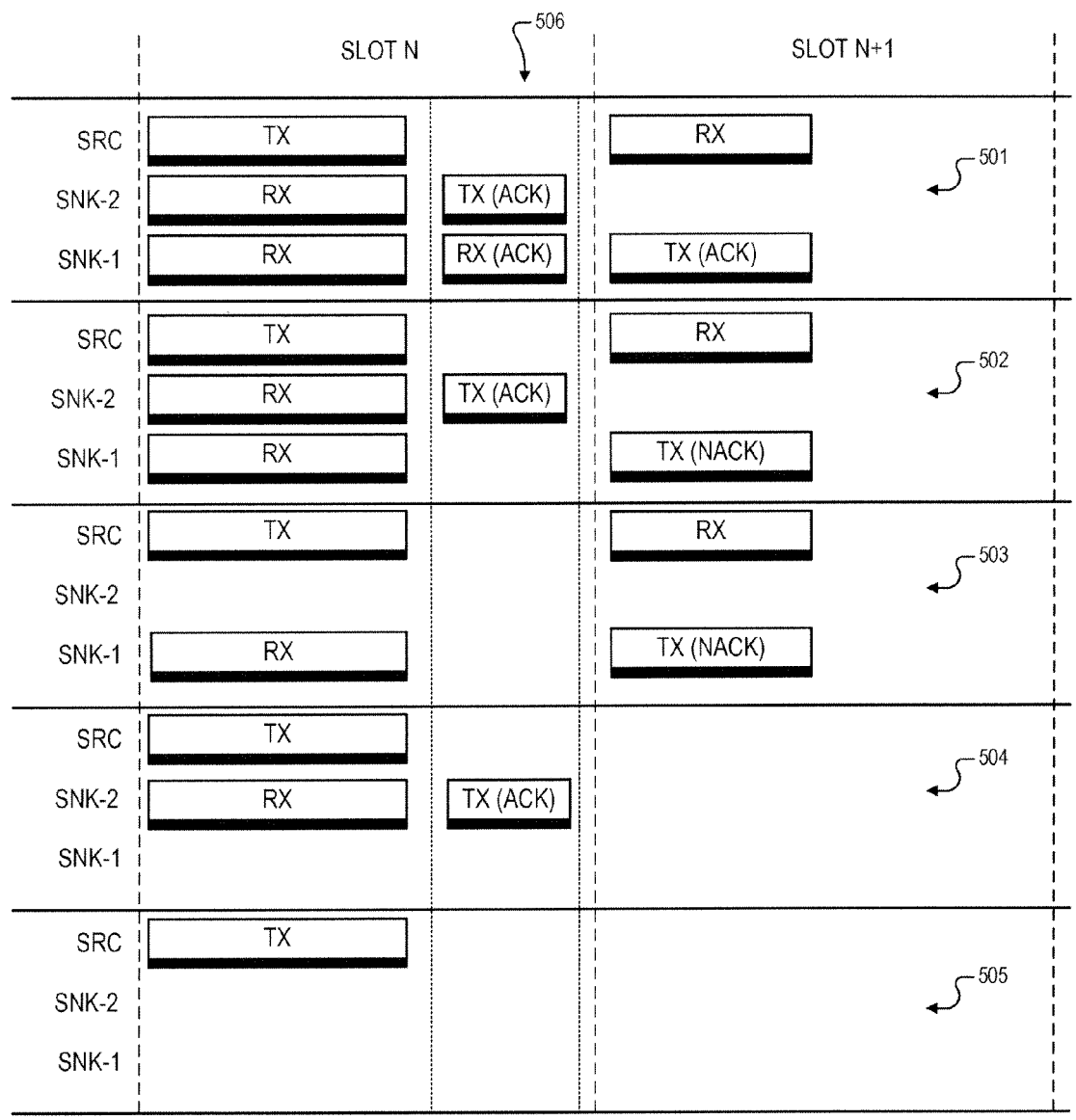
FIG. 5 is a timing diagram illustrating operation of the wireless audio system of FIG. 4.

FIG. 5 is a timing diagram illustrating operation of the wireless audio system 400 for five different cases 501-505 between two consecutive timing slots N and N+1. In each case operation or function of the SRC 101, SNK-2 and SNK-1 are listed as transmission (TX) or reception (RX). An idle period 506 is shown during slot N for SNK-2 to acknowledge reception of a wireless packet by sending an acknowledge (ACK) packet to the SNK-1.

Bluetooth slaves that receive a packet during slot N acknowledge that packet during slot N+1. SNK-1 only provides a positive acknowledgement to the SRC 101 if it has received a packet and if it receives an acknowledgement from SNK-2 indicating that SNK-2 also successfully received the packet. Therefore, SRC 101 re-transmits any packet missed by either SNK-2 or SNK-1. The retransmit filtering mechanism in Bluetooth allows SNK-2 and SNK-1 to filter out duplicate packets due to re-transmission.

In the first case 501, SNK-2 and SNK-1 both successfully receive an audio information packet transmitted by the SRC 101 during slot N. During the idle period 506 of slot N, SNK-2 transmits an acknowledge packet (TX ACK) indicating successful reception of the packet, which is successfully received by SNK-1 (RX ACK). In the next slot N+1, SRC 101 receives a positive acknowledge packet from SNK-1 indicating successful transmission of the audio information packet.

Operation of the second case 502 is similar in which SNK-1 and SNK-2 both successfully receive the audio information packet from the SRC 101 during slot N. However, SNK-1 does not successfully receive the acknowledge packet from SNK-2 (missing RX ACK). In the next slot N+1, SNK-1 transmits a negative acknowledge packet (NACK) to the SRC 101 (or provides no response at all) indicating failure of reception of the packet (even though both loudspeakers may have successfully received the audio information packet from the audio source). In this case, the SRC 101 may re-transmit the audio information packet in a subsequent slot.

For the next case 503, SNK-1 successfully receives the audio information packet from the SRC 101, but SNK-2 does not, so that it does not send an acknowledge packet during the idle period 506. Thus, although SNK-1 successfully received the audio information packet, it does not receive an acknowledge packet from SNK-2. In the next slot N+1, SNK-1 transmits a negative acknowledge packet (NACK) to the SRC 101 (or provides no response at all) indicating failure of reception of the packet. In this case, the SRC 101 may re-transmit the audio information packet in a subsequent slot.

For the next case 504, SNK-2 successfully receives the audio information packet from the SRC 101, but SNK-1 does not. SNK-2 sends the acknowledge packet to SNK-1, but SNK-1 does not receive it. In this case, SNK-1 does not respond and thus does not send an ACK in the next slot N+1, which indicates failure of reception of the packet. In this case, the SRC 101 may re-transmit the audio information packet in a subsequent slot.

For the next case 505, both SNK-1 and SNK-2 do not successfully receive the audio information packet from the SRC 101. Thus there are no further communications during the idle period 506 and slot N+1 indicating failure of reception of the packet. In this case, the SRC 101 may re-transmit the audio information packet in a subsequent slot.

Figure 6:
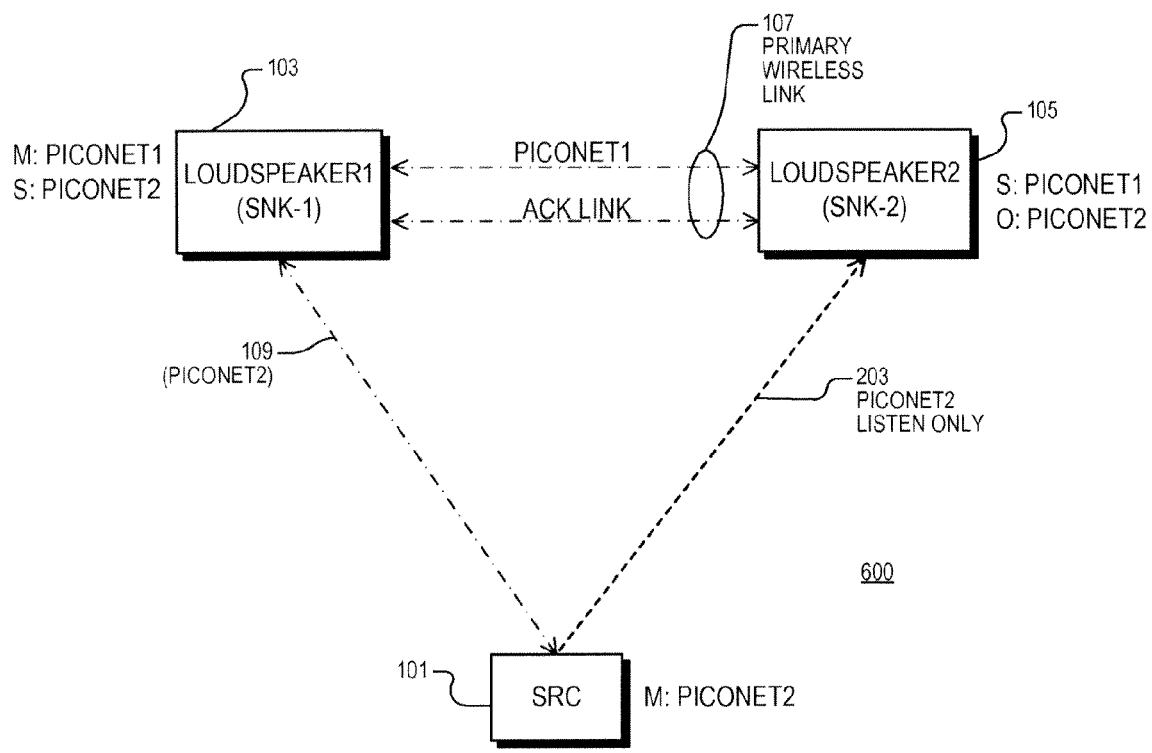
FIG. 6 is a block diagram of a wireless audio system implemented in a substantially similar manner as the audio system of FIG. 4 with a bidirectional acknowledge link for increased robustness.

FIG. 6 is a block diagram of a wireless audio system 600 implemented in a substantially similar manner as the audio system 400, except that ACK LINK is configured as a bidirectional link for increased robustness. In this case, each ACK packet sent from SNK-2 to SNK-1 may receive a response (ACKr) from SNK-1. Whenever SNK-2 fails to see the response acknowledge from SNK-1 it re-transmits the acknowledgement packet. This protocol may be generalized to allow N retransmissions of the ACK. The bi-directional link provides an added level of robustness to minimize the number of audio packet re-transmissions. It may require a radio with very fast Rx/Tx and Tx/Rx turnaround times to provide enough time for the ACK exchange and any retransmissions.

Figure 7:
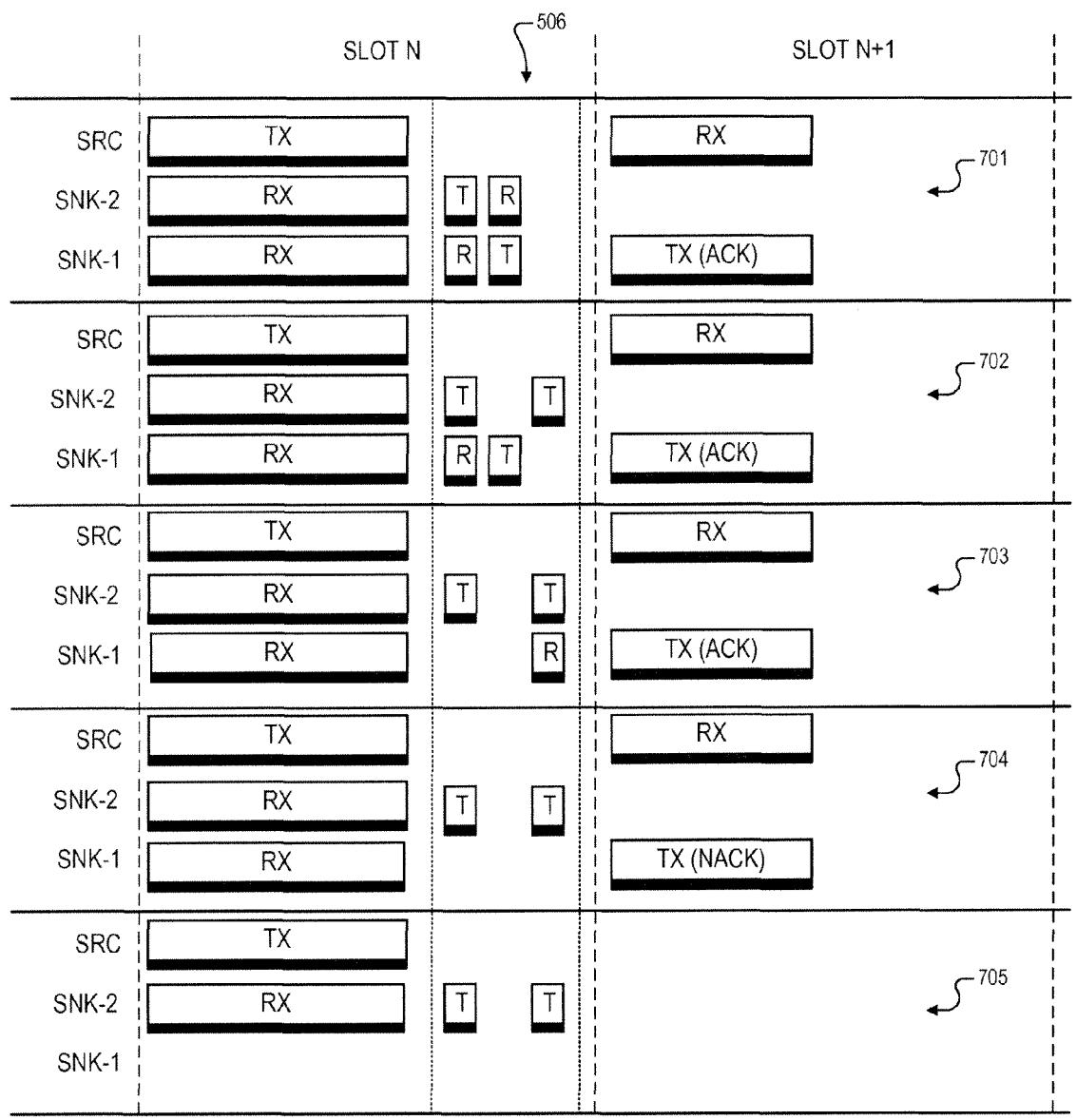
FIG. 7 is a timing diagram illustrating operation of the wireless audio system of FIG. 6.

FIG. 7 is a timing diagram similar to that of FIG. 5 illustrating operation of the wireless audio system 600 for five different cases 701-705 between the two consecutive timing slots N and N+I. In each case operation of the SRC 101, SNK-2 and SNK-1 are listed as transmission (TX) or reception (RX) for the audio information packets, or as T or R for the acknowledge packets. The same idle period 506 is shown during slot N for SNK-2 to acknowledge reception of a wireless packet. In the bidirectional ACK LINK case, SNK-2 sends an ACK to SNK-1, and SNK-1 sends a response ACK back to SNK-2 via ACK LINK. SNK-2 sends a second ACK in the event SNK-1 does not send a response ACK to the first ACK transmitted by SNK-2, or if SNK-1 sent a response ACK but the response ACK was not received by SNK-2.

For case 701, SNK-1 and SNK-2 both successfully receive an audio information packet from the SRC 101. During the idle period 506, SNK-1 receives an ACK from SNK-2 over the ACK LINK, and SNK-2 receives a response ACK from SNK-1 over the ACK LINK. SNK-1 sends a positive ACK response to SRC 101 during the next slot N+1 to acknowledge successful transmission of the audio information packet.

For case 702, SNK-1 and SNK-2 both successfully receive an audio information packet from the SRC 101. During the idle period 506, SNK-1 receives an ACK from SNK-2 over the ACK LINK, but SNK-2 misses the response ACK from SNK-1. SNK-2 thus sends a second ACK since the first was not acknowledged. Yet since the first ACK was received, SNK-1 sends a positive ACK response to SRC 101 during the next slot N+1 to acknowledge successful transmission of the audio information packet.

For case 703, SNK-1 and SNK-2 both successfully receive an audio information packet from the SRC 101. During the idle period 506, SNK-1 misses the first ACK from SNK-2 and thus does not respond. SNK-2 sends a second ACK which is received by SNK-1. Since the second ACK was received, SNK-1 sends a positive ACK response to SRC 101 during the next slot N+1 to acknowledge successful transmission of the audio information packet.

For case 704, SNK-1 and SNK-2 both successfully receive an audio information packet from the SRC 101. During the idle period 506, SNK-1 misses both the first and second ACK from SNK-2. In this case, SNK-1 sends a negative ACK response to SRC 101 during the next slot N+1 to acknowledge failure of reception of the audio information packet. Alternatively, SNK-1 may provide no response back to the SRC 101 also indicating failure. In this case, the SRC 101 may re-transmit the audio information packet in a subsequent slot.

For case 705, only SNK-2 receives the audio information packet from the SRC 101 and sends both ACK packets to SNK-1. SNK-1 does not respond to SNK-2 and does not respond to the SRC 101, indicating failure of reception of the packet. In this case, the SRC 101 may re-transmit the audio information packet in a subsequent slot.

For either wireless audio system 400 or 600, once SNK-2 has synchronized to SRC 101, the traffic on PICONET1 may be significantly reduced by transitioning to one of the low power Bluetooth states such as sniff, hold, or park. The low power state has the advantage of reducing power consumption, thereby extending battery life, while also maximizing the amount of time that SNK-1 and SNK-2 may participate in PICONET2. SNK-2 and SNK-1 remain connected in this low power state so that PICONET1 may be used for link maintenance in the event that either one loses its link to SRC 101, or if SRC 101 modifies any of the link parameters (e.g., disables encryption, changes link key, etc.).

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A wireless speaker system configured to receive audio information wirelessly transmitted by an audio source, comprising:
   a first loudspeaker including a first wireless transceiver, wherein said first loudspeaker establishes a bidirectional secondary wireless link with the audio source for receiving and acknowledging receipt of the audio information;
   a second loudspeaker including a second wireless transceiver, wherein said first and second loudspeakers communicate with each other via a primary wireless link; and
   wherein said first and second loudspeakers are configured to extract first and second audio channels, respectively, from the audio information and wherein the first transceiver is configured to:
      receive an audio packet from the audio source through the secondary wireless link;
      receive an acknowledgement corresponding to the audio packet from the second transceiver through the primary wireless link; and
      transmit an audio packet acknowledgement to the audio source through the secondary wireless link.

2. The system of claim 1 wherein the first loudspeaker is further configured to:
   determine that it did not receive, from the second transceiver, an acknowledgement corresponding to a second audio packet from the audio source, and determines not to send an acknowledgement corresponding to the second audio packet to the audio source.

3. The system of claim 1 wherein the first transceiver is configured to communicate a communication parameter to the second transceiver via the primary wireless link, wherein the communication parameter is to enable the second transceiver to observe the secondary wireless link and extract the second audio channel from the audio information transmitted by the audio source via the secondary wireless link.

4. The system of claim 1 wherein the secondary wireless link is configured according to Bluetooth protocol.

5. The system of claim 1 wherein the second transceiver does not establish a direct communication link with the audio source.

6. A speaker comprising:
   a first transceiver configured to communicate with an audio source through a first bidirectional wireless link and to communicate with a second speaker through a second bidirectional wireless link; and
   a processor configured to perform operations comprising:
      determining whether an audio packet has been received from the audio source through the first bidirectional wireless link;
      determining whether a snoop acknowledgement corresponding to the audio packet has been received from the second speaker through the second bidirectional wireless link; and,
      transmit, to the audio source, an audio packet acknowledgement corresponding to the audio packet when the audio packet has been received from the audio source and the snoop acknowledgement has been received from the second speaker.

7. The speaker of claim 6 wherein the processor is further configured to discard a second receipt of the audio packet from the audio source as a duplicate transmission.

8. The speaker of claim 6 wherein the processor is further configured to:

determine not to transmit the audio packet acknowledgement when the snoop acknowledgement has not been received from the second speaker.

9. The speaker of claim 6 wherein the first transceiver is configured to communicate a communication parameter to a second transceiver via the second bidirectional wireless link, wherein the communication parameter is to enable the second transceiver to observe the first bidirectional wireless link.

10. The speaker of claim 6 wherein the speaker comprises an ear bud.

11. The speaker of claim 6 wherein the processor is further configured to:
determine not to transmit the audio packet acknowledgement when the snoop acknowledgement has been received from the second speaker but the audio packet has not been received from the audio source.

12. The speaker of claim 11, wherein the processor is further configured to:
receive a retransmission of the audio packet from the audio source.

13. The speaker of claim 11, wherein the processor is further configured to:
transmit a negative acknowledgement (NACK) packet when the audio packet has not been received from the audio source.

14. A method performed by a first speaker having a first wireless transceiver, to receive audio information wirelessly transmitted by an audio source, the method comprising:
establishing a bidirectional secondary wireless link with the audio source;
establishing a primary wireless link with a second wireless transceiver; and
determining whether an audio packet has been received from the audio source through the secondary wireless link;
determining whether a snoop acknowledgement corresponding to the audio packet has been received from the second transceiver through the primary wireless link; and
transmitting, to the audio source, an acknowledgement for the audio packet when the audio packet has been received from the audio source and the snoop acknowledgement corresponding to the audio packet has been received from the second transceiver.

15. The method of claim 14 further comprising:
discarding a retransmission of the audio packet by the audio source responsive to determining that the retransmission is a duplicate audio packet.

16. The method of claim 15 further comprising:
receiving an acknowledgement from the second transceiver in response to the retransmission; and
transmitting, by the first transceiver, an acknowledgement associated with the retransmission to the audio source.

17. The method of claim 14 wherein the first transceiver is included in a first ear bud and the second transceiver is included in a second ear bud.

18. The method of claim 14 further comprising
determining that an acknowledgement corresponding to a second audio packet from the audio source has not been received from the second transceiver, and determining not to send an acknowledgement corresponding to the second audio packet to the audio source.

19. The method of claim 14 further comprising
transmitting a communication parameter to the second transceiver via the primary wireless link, wherein the communication parameter is to enable the second transceiver to observe the secondary wireless link.

20. The method of claim 14 wherein the second transceiver does not establish a direct communication link with the audio source.

* * * * *